3,421,910
STENCIL DUPLICATING PASTE INK

John L. Gilson, Morton Grove, and Gail V. Larson, Glen Ellyn, Ill., assignors to A. B. Dick Company, Niles, Ill., a corporation of Illinois
No Drawing. Filed Nov. 10, 1964, Ser. No. 410,314
U.S. Cl. 106—14.5    13 Claims
Int. Cl. C09d 11/00

ABSTRACT OF THE DISCLOSURE

An emulsion paste ink for stencil duplication having a mineral oil content consisting of one portion having an API number less than 26 and preferably within the range of 20–23 and a separate portion having an API number above 32 and preferably within the range of 32–37 whereby more stable ink of improved characteristics is secured. Aside from the combination of mineral oils, the ink composition is formulated to contain petroleum sulfonate, tinctorial agents, a surface active agent, and a polyol with water making up the remainder.

---

This invention relates to a water emulsion paste ink for use in stencil duplication and it relates more particularly to a paste ink from which copies of good quality can be secured on a rotary stencil duplicating machine.

It is an object of this invention to produce a paste ink for use in the production of copies by stencil duplication and it is a related object to produce a paste ink, as distinguished from a fluid ink, from which copies of good quality can be produced and in which the paste consistency is secured in the ink composition by calculated incompatibilities between materials as distinguished from merely increase of the solids content and wherein such calculated incompatibilities are achieved without sacrificing such characteristics as stability of the ink composition.

Water emulsion, stencil duplicating inks of fluid consistency can be produced of the combination which makes use of petroleum sulfonates, carbon black and a non-ionic emulsifying agent such as sorbitol mono-oleate, and mineral oil as essential ingredients, when the mineral oil has an API number greater than 32 and preferably within the range of 32 to 36. Mineral oil having an API number less than 32 was believed to be impractical for use in the formulation of a water emulsion stencil duplicating ink because mineral oils of lower API numbers tended to introduce instabilities into the ink composition.

It has now been found that wide departure to make use of a mineral oil component having an API number less than 26, and preferably within the range of 20 to 23, in combination with a mineral oil component having an API number within the conventional range of above 32, and preferably within the range of 32 to 37, will provide an aqueous emulsion stencil duplicating paste ink which is stable, and which enjoys a number of characteristics that operate to make it superior to stencil duplicating paste inks which have heretofore been employed.

The following examples of water emulsion stencil duplicating paste inks, embodying the features of this invention, are given by way of illustration, but not by way of limitation:

EXAMPLE 1

| | Percent by weight |
|---|---|
| Petroleum sulfonate | 12.4 |
| Mineral oil API 20–23 | 4.0 |
| Mineral oil API 32–36 | 19.0 |
| Rosin | 1.0 |
| Carbon black emulsion (42% solids) | 12.0 |
| Sorbitol mono-oleate (nonionic wetting agent) | 8.0 |
| Glycerol | 3.0 |
| Water | 38.6 |

EXAMPLE 2

A component:   Percent by weight
| | |
|---|---|
| Mineral oil API 22, viscosity 2125 sec. Saybolt 100° F. | 4.0 |
| Rosin | 1.0 |

B component:
| | |
|---|---|
| Mineral oil API 32–37, viscosity 42 sec. Saybolt 100° F. | 12.0 |
| Petroleum sulfonate | 20.0 |
| Sorbitan mono-oleate | 8.0 |
| Glycerine | 3.0 |

C component:
| | |
|---|---|
| Carbon black (42% dispersion) | 12.0 |
| Bactericide (Dioxin) | 0.1 |
| Water | 39.9 |

Component A is combined with heat and agitation. The elements of component B are blended together with agitation. A and B are blended and C is added slowly with stirring to form the paste.

As used herein, the term "petroleum sulfonate" is intended to refer to an alkali metal or alkaline earth metal petroleum sulfonate such as sodium, calcium or potassium petroleum sulfonate. In practice, it is desirable to make use of an amount of such petroleum sulfonate greater than 8 percent by weight but less than 16 percent by weight of the paste ink and it is preferred to make use of an amount within the range of 10 to 14 percent by weight.

As the mineral oil components, it is desirable to make use of mineral oils having a paraffin base. In accordance with the practice of this invention, it is essential, for the production of a paste ink, to make use of a combination of mineral oils wherein one portion is formulated to have an API number less than 26 and preferably within the range of 20 to 23 and the other portion is selected to have an API number greater than 32 and preferably within the range of 32 to 37 with the two portions being present in the paste ink composition in the ratio of one part by weight of the mineral oil component having an API number less than 26 to 1 to 4 parts by weight of the mineral oil component having an API number greater than 32. In the absence of the mineral oil portion having an API number below 26 in the described combination with a mineral oil portion having an API number greater than 32, a paste ink having the desired degree of stability and workability on a rotary stencil duplicating machine cannot be secured. The total of the mineral oil subdivided in the described ratio should be greater than 20 percent by weight but less than 30 percent by weight of the ink composition and preferably within the range of 22 to 25 percent by weight.

As the tinctorial agent, use can be made of a dyestuff or pigment but, in the preferred practice of this invention, it is desirable to make use of a carbon black in the form of a carbon black dispersion in an aqueous medium as illustrated in Example 1. When use is made of a dyesuff, 3 to 7 percent by weight of the ink composition is sufficient to impart the desired color intensity. When use is made of a pigment such as dispersed carbon black, it is desirable to employ an amount within the range of 2 to 10 percent by weight and preferably an amount within the range of 4 to 7 percent by weight of the ink composition.

The sorbitol mono-oleate of Example 1 can be replaced by other nonionic surface active agents and, for this purpose, use can be made of other polyhydric alcohol esters of high molecular weight organic or fatty acids, such as sorbitan sesquioleate, sorbitan mono-stearate, sorbitan trioleate, sorbitan mono-laurate polyoxyethylene derivatives, sorbitan mono-palmitate polyoxyethylene derivatives and sorbitan monostearate polyoxyethylene derivatives, and the like. In practice, it is desirable to make use of the surface active agent in an amount within the range of 3 to 20 percent by weight of the ink composition.

Instead of glycerol, use may be made of other polyhydric alcohols or polyols such as diethylene glycol, ethylene glycol and the like. The amount of water miscible polyol may range from 1 to 6 percent by weight of the ink composition and preferably in an amount within the range of 3 to 5 percent by weight.

Instead of rosin, use can be made of other rosinates or salts or esters of abietic acid wherein such rosin or rosinate is present in the paste ink composition in an amount within the range of 0.5 to 4 percent by weight and preferably in an amount within the range of 1 to 3 percent by weight.

The following example will illustrate the broad concepts of this invention:

EXAMPLE 3

| Material | Percent by weight | |
|---|---|---|
| | Broad range | Preferred range |
| Petroleum sulfonate | 8-16 | 10-14 |
| Mineral Oil API 20 to 26 | 2-10 | 3-5 |
| Mineral Oil API 32 to 37 | 17-30 | 17-20 |
| Rosin | 0.5-4 | 1-3 |
| Tinctorial agent | 2-10 | 4-7 |
| Non-ionic surface active agent | 3-20 | 3-20 |
| Polyol | 1-6 | 3-5 |
| Water | Balance | Balance |

In the foregoing example, all of the ingredients except the water and pigment dispersion are combined and then the water and pigment dispersion are slowly added with stirring to form a composition in the form of a paste which can be packaged in tubes or other suitable containers.

It will be apparent from the foregoing that we have provided a new and improved composition for paste inks of the stencil duplicating type and wherein the paste ink enjoys good shelf life and operating characteristics over extended periods and conditions of storage whereby a paste ink is produced having new and improved characteristics.

It will be understood that changes may be made in the details of formulation and fabrication without departing from the spirit of the invention, especially as defined in the following claims.

We claim:
1. A stencil duplicating paste ink consisting essentially of 8 to 16 percent by weight petroleum sulfonate, 2 to 10 percent by weight mineral oil having an API number within the range of 20 to 26, 17 to 30 percent by weight of mineral oil having an API number within the range of 32 to 37, 0.5 to 4 percent by weight of a rosin selected from the group consisting of rosin and a derivative thereof, 2 to 10 percent by weight of a tinctorial agent, 3 to 20 percent by weight of a nonionic surface active agent, 1 to 6 percent by weight of a polyol, the balance being water.

2. A stencil duplicating paste ink as claimed in claim 1 in which the mineral oil having an API number within the range of 20 to 26 is a mineral oil having an API number within the range of 20 to 23.

3. A stencil duplicating paste ink as claimed in claim 1 in which the mineral oil having an API number within the range of 32 to 37 is a mineral oil having an API number within the range of 32 to 34.

4. A stencil duplicating paste ink as claimed in claim 1 in which the polyol is glycerol.

5. A stencil duplicating paste ink as claimed in claim 1 in which the surface active agent is sorbitol monooleate.

6. A stencil duplicating paste ink as claimed in claim 1 in which the tinctorial agent is carbon black and in which the carbon black is present in an amount within the range of 2 to 10 percent by weight of the ink composition.

7. A stencil duplicating paste ink as claimed in claim 6 in which the carbon black is of an amount within the range of 4 to 7 percent by weight.

8. A stencil duplicating paste ink consisting essentially of 10 to 14 percent by weight petroleum sulfonate, 3 to 5 percent by weight of a mineral oil having an API number within the range of 20 to 26, 17 to 20 percent by weight of a mineral oil having an API number within the range of 32 to 37, 1 to 3 percent by weight of a rosin compound, 4 to 7 percent by weight of a tinctorial agent, 3 to 20 percent by weight of a nonionic surface active agent, 3 to 5 percent by weight of a polyol, the balance being water.

9. A stencil duplicating paste ink consisting essentially of 10 to 14 percent by weight of a petroleum sulfonate, 20 to 30 percent by weight of a mineral oil sub-divided into a first portion having an API number within the range of 20 to 26 and a second portion having an API number within the range of 32 to 37, in which the portions of mineral oil are present within the ratio of one part by weight of the first portion to 1 to 4 parts by weight of the second portion, 1 to 3 percent by weight of a rosin compound, 4 to 7 percent by weight of a tinctorial agent, 3 to 20 percent by weight of a surface active agent, 3 to 5 percent by weight of a polyol, the balance being water.

10. A stencil duplicating paste ink as claimed in claim 9 in which the tinctorial agent is carbon black.

11. A stencil duplicating paste ink as claimed in claim 9 in which the rosin compound is rosin.

12. A stencil duplicating paste ink as claimed in claim 9 in which the surface active agent is a nonionic surface active agent.

13. A stencil duplicating paste ink as claimed in claim 9 in which the polyol is glycerol.

References Cited

UNITED STATES PATENTS

| 2,772,175 | 11/1956 | Beatty et al. | 106—30 |
| 2,967,782 | 1/1961 | Manley | 106—32 |
| 2,980,545 | 4/1961 | Shoemaker | 106—22 |

JULIUS FROME, *Primary Examiner.*

JOAN B. EVANS, *Assistant Examiner.*

U.S. Cl. X.R.

106—30, 32, 239, 285; 117—35.6